Oct. 16, 1962  E. N. MICHAEL  3,058,226
FLOATING AND TILTING SPECIMEN SUPPORT TABLE
Filed July 10, 1959  3 Sheets-Sheet 1

Edward Noel Michael,
INVENTOR.
BY S. J. Rotondi
A. J. Dupont
L. Flank

Oct. 16, 1962 E. N. MICHAEL 3,058,226
FLOATING AND TILTING SPECIMEN SUPPORT TABLE
Filed July 10, 1959 3 Sheets-Sheet 2
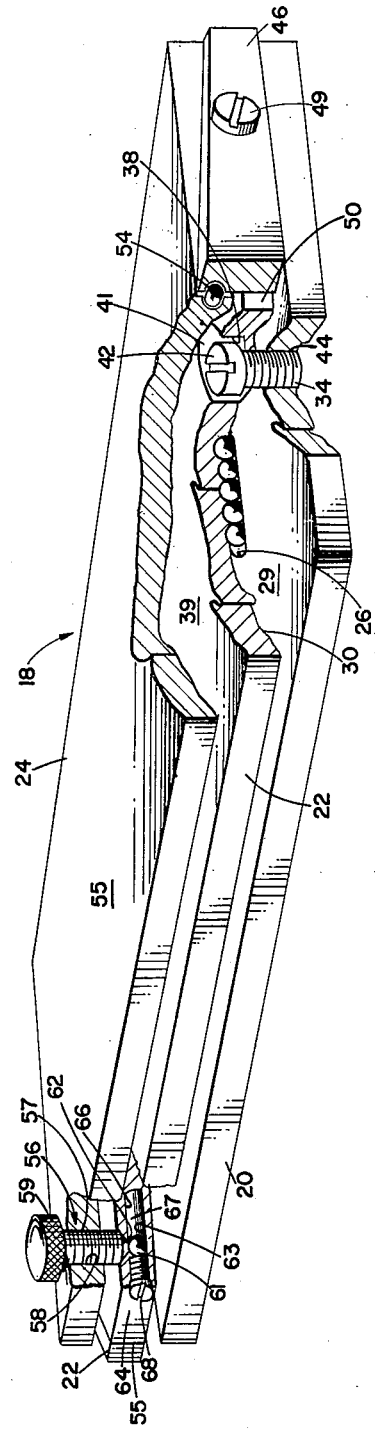
FIG. 3.
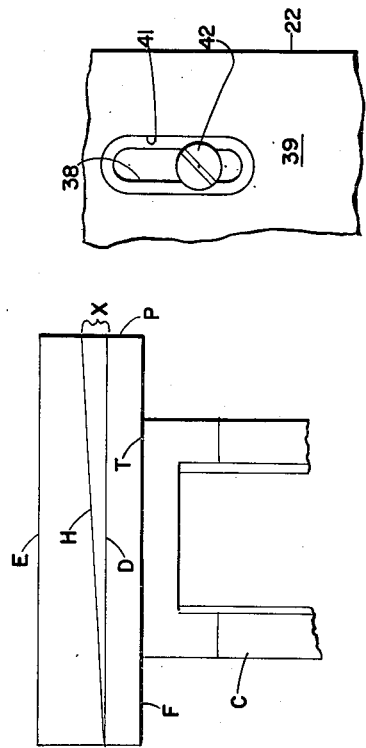
FIG. 5.
FIG. 4.
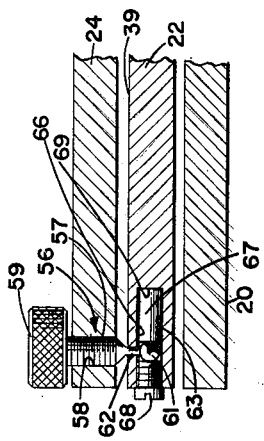
FIG. 8.
Edward Noel Michael,
INVENTOR.
BY Oct. 16, 1962      E. N. MICHAEL      3,058,226
FLOATING AND TILTING SPECIMEN SUPPORT TABLE
Filed July 10, 1959      3 Sheets-Sheet 3

Edward Noel Michael,
    *INVENTOR.*

BY

United States Patent Office 3,058,226
Patented Oct. 16, 1962

3,058,226
FLOATING AND TILTING SPECIMEN SUPPORT TABLE
Edward Noel Michael, 1610 Alabama St., Huntsville, Ala.
Filed July 10, 1959, Ser. No. 826,379
8 Claims. (Cl. 33—174)
(Granted under Title 35, U.S. Code (1952), sec. 266)

The invention described herein may be used by or for the Government for governmental purposes without the payment of any royalty thereon.

This application is a continuation-in-part of my previously filed application Serial Number 759,371, filed September 5, 1958, now abandoned.

The present invention relates to measuring devices and more specifically to an improved specimen support table for an external diameter measuring machine which table will move freely in a horizontal direction and tilt about a horizontal axis.

Frequently in industry, particularly in the guided missile field, it is necessary to measure the external size of an item of manufacture with a high degree of accuracy. Accuracy to the nearest 0.00001 of an inch is often required and can be attained by using a measuring machine of the type represented by Pratt and Whitney Standard Measuring Machine, List No. 2000, as listed in catalog, "Pratt & Whitney Gages," copyright 1947 Niles-Bement-Pound Company. In order to understand the operation and utility of the present invention, it will be necessary to understand the operational problems of this type measuring machine.

Essentially, a measuring machine of this type consists of a measuring stock indicated generally by A (FIGURE 1), a pressure measuring tailstock indicated generally by B, and a table of some sort C for supporting the specimen to be measured. All components are adjustably but rigidly mounted on a rigid bed G. The dotted outline S represents a specimen to be measured. The present invention pertains to an improved specimen support table which can either rest on the permanent table C or be constructed for mounting directly on bed G.

The measuring head A is essentially comprised of an anvil $A_1$ which is adjustable in two directions as indicated by arrow $A_2$ by means of a calibrated adjusting screw $A_3$. Said calibrated screw provides a means for determining the exact position of anvil $A_1$ relative to a fixed hairline mark in a sighting microscope.

The tailstock B is essentially composed of an anvil $B_1$ which is depressed by pressure in the direction indicated by arrow $B_2$. Depression of anvil $B_1$ is retarded by a spring housed within the tailstock B. Therefore the distance anvil $B_1$ is depressed or displaced from its original spring biased position is proportional to the pressure applied thereto. The distance anvil $B_1$ is depressed or detected by means of an electric contact point and by this method the exact pressure thereon is determined. Of course in operation the specimen S is placed between the two anvils and anvil $A_1$ tightened by means of the adjusting screw $A_3$, thereby displacing the specimen and depressing anvil $B_1$ until the preselected pressure is reached.

It will be appreciated that in measuring with accuracy to the nearest 0.00001 of an inch, the pressure on the caliper or measuring machine system is critical because of elasticity of the parts of the machine and also of the specimen. It is especially critical in the present case because the anvil $B_1$ is readily displaced by pressure. The accuracy of each measurement is directly dependent upon detecting by the device in the tailstock and controlling by means of the calibrated adjusting screw the exact pressure throughout the measuring system, i.e., the common pressure transmitted from the adjusting screw $A_3$, to anvil $A_1$, to the specimen, to anvil $B_1$, and to the spring which biases anvil $B_1$.

The operation of the machine is relatively simple. The distance between anvils $A_1$ and $B_1$ is first determined by measuring a standard gage block. Then by means of the calibrations on the adjusting screw, the size of the specimen relative to the standard gage block can be determined by exactly duplicating the pressure on the system. A preselected pressure in the range of one to two pounds is normally used. Since anvil $B_1$ must be depressed in order to detect this pressure, the specimen will also be displaced in the direction indicated by arrow $B_2$. Unless the specimen is supported in a manner which will allow displacement of the specimen without friction, the pressure at the point of contact $A_1$ and hence on the measuring head will be greater due to friction than the pressure indicated by the tailstock pressure detecting device. Because the pressure involved is small, the least amount of added pressure will induce appreciable error in the measurement. This particular problem has been solved in the past by mounting the support table on ball bearings to produce what is called a "floating" table.

However another problem inherent in measuring has made the bearing supported "floating" tables now in use extremely expensive. This problem is illustrated in FIGURE 4 wherein line D represents the true diameter of the specimen E or dimension to be measured, line H represents the hypotenuse of a right triangle formed by lines D and X, and F is the face of the specimen which rests upon the table top T. In order to get an accurate measurement of the true diameter D, the diameter D must be precisely aligned with the measuring axis formed by anvils $A_1$, $B_1$. The least misalignment will result in a measurement of H, the hypotenuse, which of course exceeds the distance D. In an effort to provide a "floating" table which will support the specimen so that the diameter D is exactly aligned as desired, the "floating" tables now in use are accurately machined and constructed with precision throughout to insure that the top surface T of the table is exactly parallel to the measuring axis formed by anvils $A_1$, $B_1$. Precision machining and construction make these tables extremely expensive. Furthermore, these "floating" tables are adequate only so long as the face F of the specimen is exactly parallel to the true diameter D. The least degree of unparallelism will again result in the measurement of the hypotenuse H, rather than the diameter D. As a practical matter, a specimen is seldom measured which has a face F exactly parallel to the diameter D, because even when it is desired to control the diameter D of a specimen with great accuracy, it is seldom required that the face F be exactly parallel to the diameter D. So as a practical matter, the "floating" tables now in use are wholly inadequate in addition to being very expensive.

Therefore the object of the present invention is to provide a "floating" specimen support table which will move freely in a horizontal direction so as not to induce additional pressure into the measuring system, and at the same time provide a table which will tilt or rotate about a horizontal axis to allow repeated measurements to be taken quickly and accurately until the smallest measurement is obtained which will, as a geometric fact, be the true diameter of the specimen.

Another object of the present invention is to provide a "floating" specimen support table which does not require precision construction and is therefore relatively inexpensive.

Still another object of the present invention is to provide a "floating" specimen support table which can be tilted to facilitate measurement of a specimen which does not have a face exactly parallel to the discussion to be measured.

Additional objects and advantages of the present invention will be obvious to those skilled in the art from the following detailed description and drawings wherein:

FIGURE 3 is a perspective view of the present invention broken away in part to reveal features of construction.

FIGURE 4 is a diagram illustrating an inherent problem of measuring which is substantially solved by the present invention.

FIGURE 5 is an enlarged, partial plan view showing a feature of construction of the table.

FIGURE 8 is an enlarged sectional view taken along line 8—8 of FIGURE 2.

Figure 2:
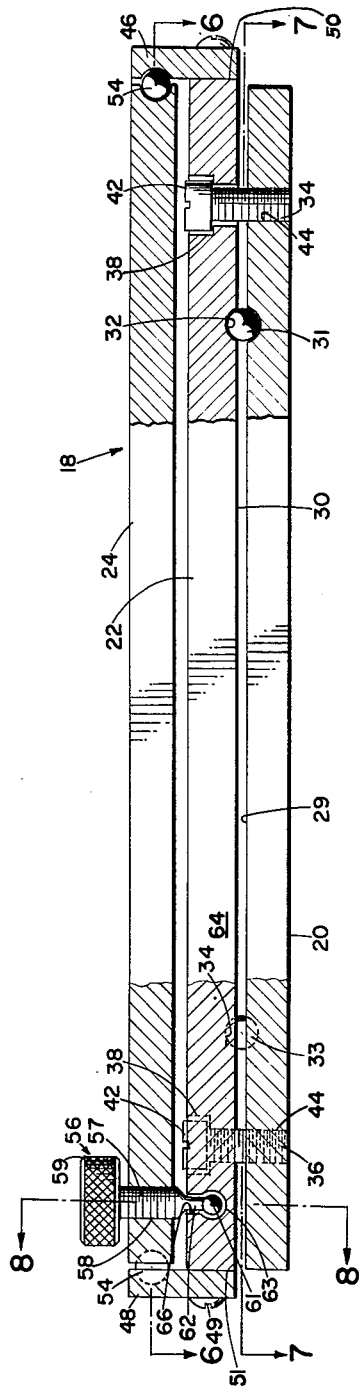
FIGURE 2 is a detailed side elevation of the floating table.

With the continued reference to the drawings, one embodiment of the present invention is shown as comprising a floating and tilting support table 18 comprising principally three, vertically spaced, elongate similar rectangular plates 20, 22 and 24 arranged in a stack as shown in FIGURE 2 and 3. The specimen support table 18 is adapted to be placed on the top of the standard upright support table C of a measuring machine, such as that shown in FIGURE 1, secured at its lower end onto a support structure G. Of course, if desired, the support table 18 could be so fabricated that the plate 20 would be an integral part of the support structure C rather than being non-affixedly placed thereon.

Figure 1:
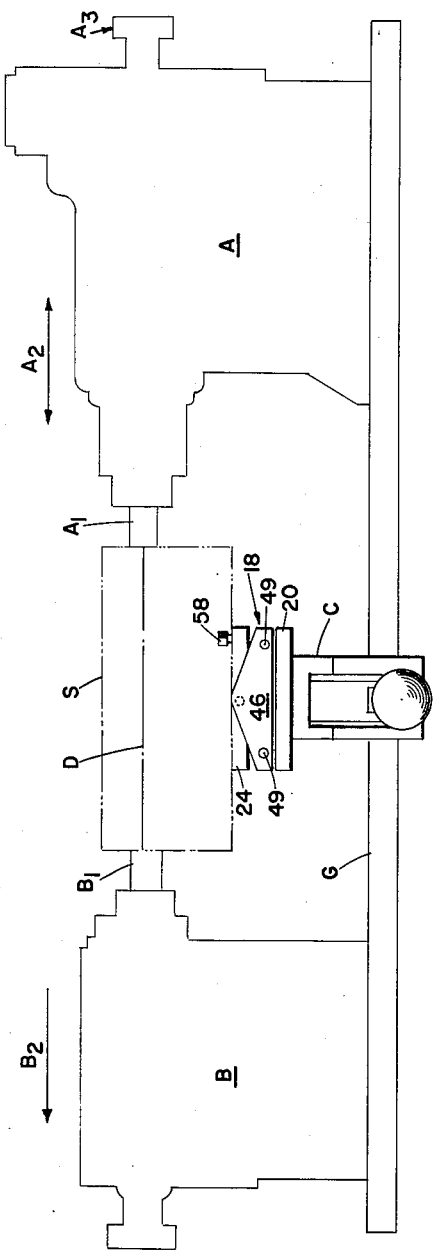
FIGURE 1 is a schematic view of a measuring machine with the floating support table thereon and in position for use.
Figure 7:
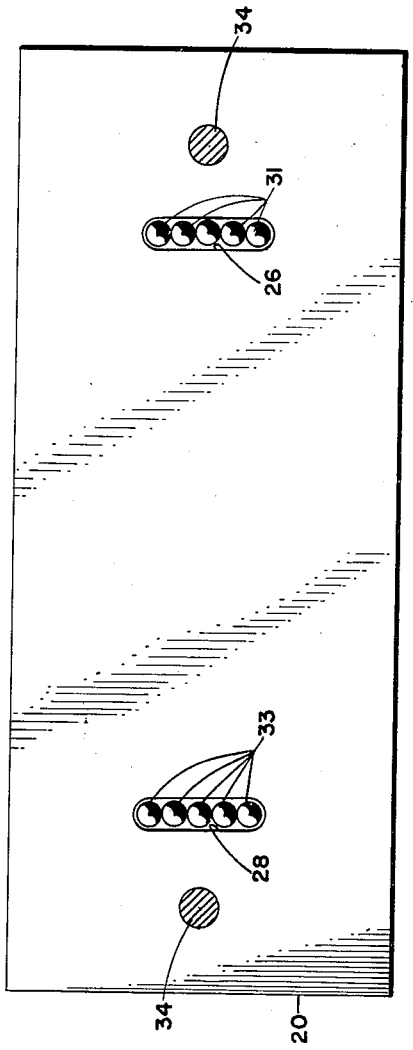
FIGURE 7 is a sectional view taken along line 7—7 of FIGURE 2.

The lower plate 20 is a base plate which is adapted to rest upon the top of the support structure G, as clearly shown in FIGURE 1. The base plate 20 defines the stationary portion of the table 18. The intermediate plate 22 is carried by the base plate 20 for movement transversely of the latter. In order for the intermediate plate 22 to be freely movable transversely of the base plate 20 with minimum friction so that it is substantially floating thereon, the base plate 20 is provided with a pair of elongate, shallow arcuate grooves 26 and 28 (FIGURE 7) opening through the upper face 29 thereof and arranged in spaced, parallel relation normal to the longitudinal axis of the base plate so that its length may be, if desired, equally disposed to opposite sides of the longitudinal axis. The lower face 30 (FIGURES 2 and 3) of the intermediate plate 22 is provided with elongate, shallow arcuate grooves 32 and 34 which are adapted to mate with the similar grooves 26 and 28 respectively in the upper face 29 of the base plate 20 so that sets of ball bearings 31 and 33 may be received in respective ones of the mating grooves which then define the races for the respective sets of ball bearings.

In order to prevent the loss of the sets of ball bearings 31 and 33, arranged in parallel rows (FIGURE 7), screws 34 and 36 (FIGURES 2 and 3) are disposed to extend through and ride in respective parallel, elongate slots 38 arranged normal to the longitudinal axis of the intermediate plate 22 and opening through its upper face 39 and lower face 30. The elongate grooves 38 (FIGURE 5) are further provided with a countersunk portion 41 which opens through the upper face 39 of the intermediate plate 22 to receive therein the heads 42 of the respective screws 34 and 36. As clearly seen in FIGURES 2 and 3, the screws 34 and 36 threadably engage into tapped openings 44 in the base plate 20 so that the plates 20 and 22 can be selectively spaced at a proper distance apart to maintain the sets of ball bearings 31 and 33 while at the same time insuring that the intermediate plate will be floatingly supported upon the base plate 20 for movement transversely thereof. The length of the slots or grooves 38 being effective to limit the amount of transverse travel of the intermediate plate 22 relative to the base plate 20.

Figure 6:
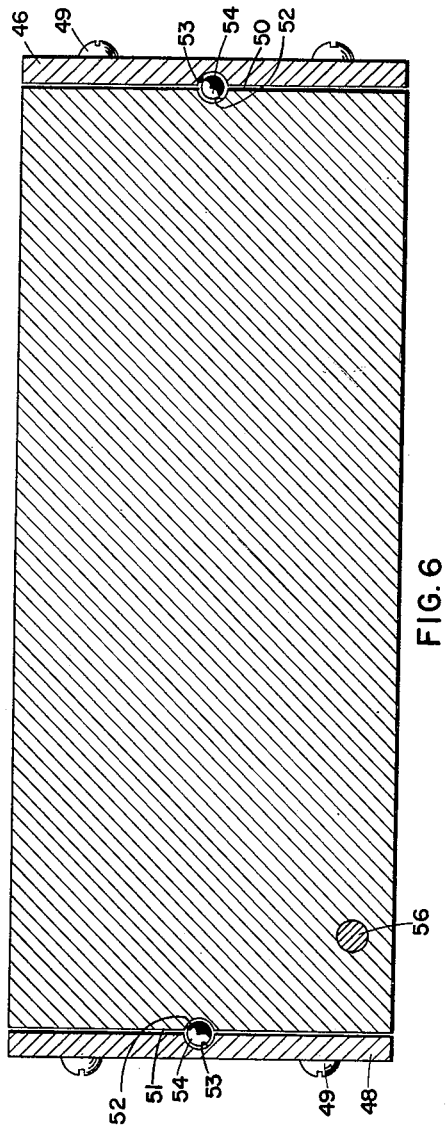
FIGURE 6 is a sectional view taken along line 6—6 of FIGURE 2.

The top of specimen supporting plate 24 has a longitudinal dimension slightly smaller than that of the intermediate plate 22 (FIGURE 2) and is carried by the plate 22 for movement therewith transversely of base plate 20 and for pivotal movement in an arcuate path about a horizontal axis coincident with the longitudinal axis of the top plate and above and parallel to and lying in a common vertical plane with the longitudinal axis of plate 22 (FIGURE 6). To pivotally mount the top plate 24 on the plate 22, upstanding pivot plates 46 and 48 are secured, as by screws 49, to respective opposite end faces 50 and 51 of the intermediate plate 22 (FIGURES 3 and 6) to project thereabove. Centrally intermediate its ends and adjacent the top thereof, each of the pivot plates 46, 48 is provided with a circularly concave recess 52 (FIGURE 6) in its inner face abutting the respective adjacent end faces 50 and 51. An arcuate recess 53 is formed in each of the opposite end faces of the top plate 24 to be in mating relation with respective ones of the recesses 52. A pivot ball 54 is arranged to seat in the respective mating recesses, thus providing pivot points on a common longitudinal axis and about which the top plate 24 can be rotated.

To permit successive measurements of a workpiece or specimen placed on the top surface 55 of the top plate for accurately determining the true dimension of the workpiece between the spindles $A_1$ and $B_1$, an adjusting screw 56 is carried by the upper plate adjacent one corner thereof and upstanding therefrom (FIGURES 2 and 3). In order to permit reciprocable movement of the adjusting screw 56 transversely through the top plate 24 and thereby cause pivotal movement of the top plate relative to the intermediate plate, the top plate has a tapped bore 58 (FIGURE 8) transversely therethrough and into which the screw shank 57 is threadedly received. The upper end of the adjusting screw has an enlarged knurled head 59, and at its lower end it has a ball 61 connected to the shank of the screw by a narrow neck 62 which extends longitudinally from the shank. A circular passage 63 (FIGURE 3) is drilled into one side 64 of the intermediate plate and a slot 66 is cut into the upper face 39 of the plate 22 to communicate with the passage 63. The neck 62 extends through the slot 66 with the ball 61 disposed in the passage 63 to fix the lower end of the adjusting screw in the intermediate plate. To prevent lateral movement of the ball 61 in the passage 63 and to selectively adjust the amount of friction opposing the turning of the screw 56, a back up block 67 (FIGURE 8) is arranged in the passage 63 between the ball 61 and the closed end 69 of the passage and a set screw 68 is threadedly engaged into the end of the passage opening through the side 64 to be advanced into a selective degree of frictional engagement with the ball end 61 of the adjusting screw 56.

In operation, the table 18 is placed onto the top of the support structure C disposed approximately centrally between the spindles $A_1$ and $B_1$ of the measuring machine. The workpiece of specimen to be measured is then placed on the upper support surface 55 of the top plate 24 with the dimension D to be measured lying between the measuring machine spindles $A_1$ and $B_1$. The table is disposed on the support structure G so that transverse movement of the plates 22 and 24 will be generally parallel to the dimension D. Since the top plate 24 will float along with the intermediate plate 22 relative to the stationary base plate 20 upon the sets of ball bearings 31 and 33, as the spindle $A_1$ is advanced into contact with the workpiece S, approximately equal pressure on both the spindles will result due to the floating action of the plates 22 and 24 which offer minimum resistance to the advance of the spindle $A_1$. In actual use, a gauge on the measuring machine will indicate the optimum point of position of the workpiece where the pressures of the measuring spindles $A_1$ and $B_1$ against opposite sides of the workpiece are equalized. If, as in many instances, either the top surface 55 of the top plate 24 or the face of the workpiece lying on the top plate is not accurately machined so that it is parallel to the dimension D, the adjusting screw 56 is turned in the proper direction to rotate or tilt the top plate about its longitudinal axis and bring the workpiece into a position on the table 18 where the dimension D is the shortest distance between the spindles $A_1$ and $B_1$. Set screw 68 is adjusted to apply friction against the free rotation of the adjusting screw 56 to neutralize any slack present in the threaded connection between the adjusting screw and the internal threading of the bore 58. Also, if a particular position in the path of pivotal rotation of the top plate 24 is to be kept and to be protected against accidental displacement, the set screw 68 can be tightened so as to frictionally lock against the ball end 61 and hold the adjusting screw in the desired position and hence lock the top plate in the desired position.

Having thus described one embodiment of my invention, what I claim is:

1. A specimen support table comprising a base plate, an intermediate plate having a medial longitudinal axis and a transverse axis, said intermediate plate being carried by said base plate in spaced relation thereabove for free movement in the direction defined by said transverse axis, and a top plate adapted to support a specimen thereon carried by said intermediate plate for movement therewith and for pivotal movement in an arcuate path about an axis lying in the same vertical plane with the medial longitudinal axis of said intermediate plate.

2. A specimen support table comprising an elongate base plate, an intermediate plate having a medial longitudinal axis and a transverse axis, spaced sets of transverse rows of ball bearings disposed between said base plate and said intermediate plate mounting the latter for substantially friction-free movement above said base plate in the direction defined by said transverse axis, said base plate and said intermediate plate each having spaced mating transverse grooves defining races for said sets of ball bearings, and a top plate carried by said intermediate plate for movement therewith and for pivotal movement about an axis lying in the same vertical plane with the medial longitudinal axis of said intermediate plate.

3. A specimen support table comprising an elongate base plate, an intermediate plate having a medial longitudinal axis and a transverse axis, said intermediate plate being carried by said base plate in spaced relation thereabove for substantially friction-free movement in the direction defined by said transverse axis, a top plate adapted to support a specimen thereon, means carried by said intermediate plate for mounting said top plate thereon for pivotal movement in an arcuate path about an axis lying in the same vertical plane with the medial longitudinal axis of said intermediate plate.

4. The support table as set out in claim 3 and which further includes means carried by said top plate and operatively engaging said intermediate plate for rotating said top plate into selected positions in its vertical arcuate path.

5. The support table as set forth in claim 3 and wherein said means includes a pivot plate upstandingly carried by said intermediate plate at each opposite end thereof and extending across the medial longitudinal axis of the intermediate plate, a pair of axially aligned ball pivots with one pivot carried by each of said pivot plates and said ball pivots lying in a common vertical plane with said medial longitudinal axis for pivotally mounting said top plate thereon.

6. The support table as set forth in claim 4 and wherein there is included means carried by said intermediate plate and engaging said base plate for securing the latter together in a selected spaced relation and for limiting the travel of said intermediate plate transversely of said base plate.

7. The support table as set forth in claim 6 and wherein said intermediate plate is provided with parallel elongated slots opening through opposite faces thereof and arranged with their axes normal to the medial longitudinal axis of said intermediate plate, said last named means including a set screw disposed to extend through and ride in each of said slots and threadingly engaging said base plate, the opposite ends of said slots defining the limits of movement of said intermediate plate.

8. In a measuring machine of the type having spaced spindles and an upstanding rigid specimen support structure therebetween, a table for supporting a specimen to be measured resting on the top of said support structure, said table comprising a base plate, an intermediate plate and a top plate arranged in vertically spaced relation in a vertical stack, each of said plates having a longitudinal axis and a transverse axis, anti-friction means carried by said base plate and disposed between said base plate and said intermediate plate for allowing free-rolling movement of said intermediate plate transversely of said base plate, said top plate being carried by said intermediate plate for movement therewith and for rotation in an arcuate path about the longitudinal axis of the top plate whereby a specimen supported on said top plate can be freely moved transversely of said base plate to a self-adjusting position between said spindles and be rotated with said top plate so that its longitudinal dimension between said spindles is in a horizontal plane parallel to said spindles.

References Cited in the file of this patent

UNITED STATES PATENTS

| | | |
|---|---|---|
| 1,341,646 | Jesnig | June 1, 1920 |
| 1,436,406 | Serrell | July 31, 1923 |
| 2,045,109 | Smith | June 23, 1936 |
| 2,137,485 | Greenleaf | Nov. 22, 1938 |
| 2,208,063 | Wochner | July 16, 1940 |
| 2,397,300 | Tilton | Mar. 26, 1946 |
| 2,503,580 | Fontaine | Apr. 11, 1950 |
| 2,579,290 | Bachmann | Dec. 18, 1951 |
| 2,828,589 | Hereik | Apr. 1, 1958 |

FOREIGN PATENTS

| | | |
|---|---|---|
| 896,420 | Germany | Nov. 12, 1953 |